United States Patent Office 3,478,512
Patented Nov. 18, 1969

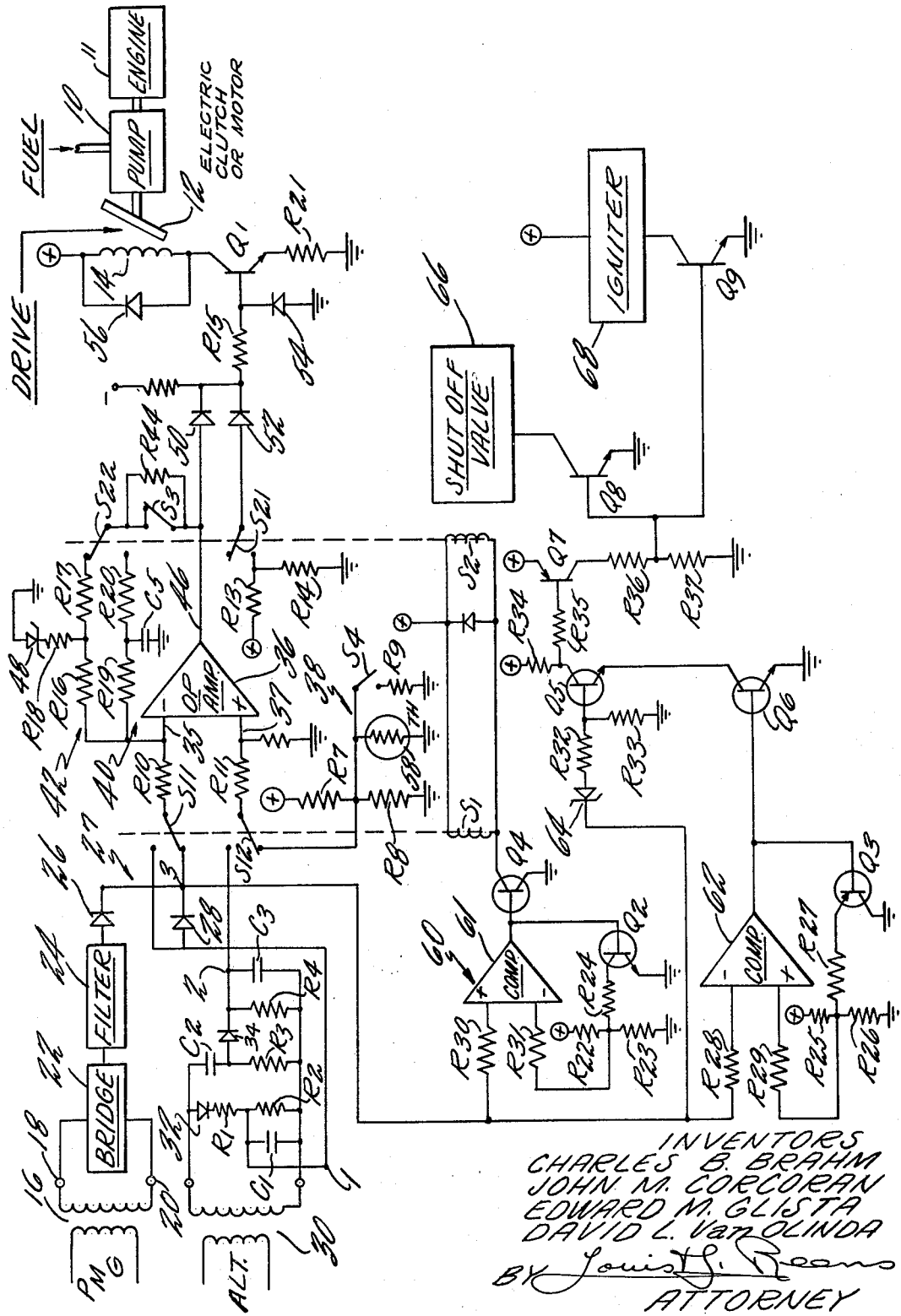

3,478,512
FUEL CONTROL FOR A SMALL GAS
TURBINE ENGINE
Charles B. Brahm, Ellington, Conn., John M. Corcoran, Piscataway, N.J., Edward M. Glista, East Longmeadow, Mass., and David L. Van Olinda, Granby, Conn., assignors to United Aircraft Corporation, East Hartford, Conn., a corporation of Delaware
Filed Nov. 3, 1967, Ser. No. 680,709
Int. Cl. F02c *9/06;* F02g *3/00;* F04b *49/06*
U.S. Cl. 60—39.28         1 Claim

ABSTRACT OF THE DISCLOSURE

A fuel control for a small gas turbine engine is described. Speed signals derived from a permanent magnet generator and an alternator are used to drive a differential amplifier having variable gain characteristics. A switch is employed to detect the occurrence of the acceleration mode of the engine control and the speed mode operation of the control to alter and select the amplifier gain characteristic commensurate with the sensed mode of operation of the control. Additional switch functions are provided to control a shutoff valve and ignite the fuel to the engine. The output voltage obtained from the variable gain amplifier is used to drive the coil of a hysteresis clutch. The clutch driven by the engine in turn drives a positive displacement pump and the variable control from the amplifier is used to vary the speed of the pump and therewith the fuel flow to the engine.

BACKGROUND OF THE INVENTION

In the design of the electronic fuel control for a small gas turbine engine, sizes and weights must be reduced without loss of the reliability and performance. To realize such objectives a significant departure from conventional fuel controls has been made by the invention herein described. The first significant departure occurs in the electro-mechanical portion of the system wherein an electro-magnetic clutch assembly is used to drive a positive displacement fuel pump thereby replacing the more conventional approach. The conventional devices utilize a fuel pump driven directly off the engine with a fuel metering package to meter the desired fuel and bypass the excess fuel back to the pump inlet. The basic components of the conventional fuel metering package include a fuel nozzle, a torque motor or proportional solenoid for modulation of the nozzle opening, a pressure regulator to control the pressure drop across the nozzle and to bypass excess fuel flow, and a relief valve to protect the flow package and the pump against pressure transients. The pressure across the nozzle of a conventional fuel metering package is regulated to assure that the fuel flow is only a function of the nozzle area.

For low power applications, for instance less than 100 horsepower, the size, weight, and cost of such a conventional fuel metering package becomes disproportionally high in comparison with the size, weight, and cost of the engine. Hence, for these low power applications the apparatus described herein offers several distinct advantages in providing a low weight, low power requirements, a minimum of moving parts yielding a longer life, a lower cost, and a simpler mechanism.

The limitation on the size of the engine for which the described fuel control is suitable is determined by a combination of the fuel flow and the pump back pressure. When these latter parameters are too large, which in general is true for engines over 100 horsepower, the required clutch size becomes too large and heavy for practical considerations.

SUMMARY OF THE INVENTION

The above described advantages are accomplished herein with a novel electronic control employing a positive constant displacement pump driven by electrically responsive driving means which is controlled as a function of electrical signals indicative of the speed and acceleration requirements of the gas turbine engine.

DESCRIPTION

In the figure a positive displacement pump 10 is provided for pumping fuel to the engine 11. The characteristic of this pump (that others need not necessarily have) which makes it suitable for this control system is its relative insensitivity to back pressure. This results in the fuel flow being primarily a function of speed, independent of the pressure and permits elimination of the pressure regulator used in conventional fuel controls.

The pump is driven by an electro-magnetic clutch 12. The clutch is driven by the engine and is provided with a control coil 14. The particular clutch is of the hysteresis type and is a commonly available item. Other magnetic clutches could be used, as for instance a magnetic particle clutch. There are disadvantages to the particle clutch, however, which include shorter operating life, low operating speeds, and lower power gains as well as sealing problems. The high gain of the hysteresis clutch (meaning the torque vs. current characteristic) represents a saving in the electronics in terms of the power requirements of the output circuitry transistors.

The hysteresis clutch has a purely magnetic coupling with no moving parts in slipping contact. Electric power is supplied to the clutch through brushes. No commutation is required and the brushes do not carry large currents as is typical in a DC motor type application. In the event the operating speed range of the magnetic hysteresis clutch is not compatible with the driving speed of the engine, the latter's drive pad may be geared down to within the range of the hysteresis clutch.

The electro-magnetic clutch is essentially a torque transmitting device with the transmission torque varying linearly over a large range with input clutch current. The torque-speed relationship in this type of clutch is a flat line.

Other electrically responsive driving means may be employed to drive the pump 10. For instance, the clutch 12 may be replaced with an AC or DC motor. In such case there will be no need to obtain an engine dirve as otherwise required by the clutch. This elimination of the engine drive compensates in weight for the additional power needed to drive the motor.

A permanent magnetic generator 16 (upper left) is attached to the engine and driven thereby to provide an AC voltage at the output terminals 18 and 20. This AC voltage is converted to a DC voltage by the bridge demodulator 22 formed by four diodes (not shown). A filter at the output 24 of the bridge attenuates the ripple. This voltage is then applied to the input of a "most gate" at the diode 26. The gate is comprised of diodes 26 and 28. The other input to the gate, applied at the anode of diode 28, is derived from an alternator 30 which is driven by the engine. The alternator speed signal is also an AC voltage whose amplitude and frequency vary as a function of the engine speed. The alternator output is impressed across a bridge circuit consisting of resistors $R_1$, $R_2$, $R_3$, and capacitor $C_2$. Diode 32 rectifies the AC voltage from the alternator 30 and capacitor $C_1$ filters the resulting DC voltage at the point one. The output of this leg of the bridge is, therefore, a DC voltage whose magnitude is proportional to the magnitude of the alternator output. The other leg of the bridge is formed by capacitor $C_2$ and resistor $R_3$. This leg of the bridge is sensitive to both amplitude and frequency and, therefore, produces an AC signal at the junction of $C_2$ and $R_3$, which is proportional to both of these quantities. The resulting AC voltage is rectified by diode 34 and filtered by $R_4$ and $C_3$. The signal generated across the bridge circuit, point one to point two, is that which is used during the speed governing mode.

During acceleration, the output of the most gate, junction 3, is applied to the input of an operational amplifier 36 through resistor $R_{10}$ and the contact $S_{11}$ of relay $S_1$. The input of the operational amplifier is differential, providing the difference between its input signals applied through $R_{10}$ and $R_{11}$. The gain and dynamic characteristic of the operational amplifier is determined by the ratio of the feedback impedances to $R_{10}$. The resistor $R_{11}$ is coupled through contact $S_{12}$ to the junction 2 of the alternator speed signal, but during acceleration the contact $S_{12}$ is in the position as shown in the drawing so that the network 38 is applied to resistor $R_{11}$.

The feedback impedances providing the variable gain characteristics of the operational amplifier comprise a speed feedback loop 40 and an acceleration feedback loop 42 each of which provides a different gain characteristic for the amplifier 36. Selection of the amplifier gain characteristic is determined by the position of the contact $S_{22}$ controlled by the relay $S_2$. The contact $S_{22}$ is coupled through either the resistor 44 or the switch $S_3$ to the output 46 of the operational amplifier 36.

The speed feedback loop 40 comprises DC feedback via resistors $R_{19}$ and $R_{20}$ and is AC decoupled by capacitor $C_5$. The acceleration feedback loop comprises DC feedback via resistors $R_{16}$ and $R_{17}$ and is further provided with a break point by connecting the center point between these resistors to ground via resistor $R_{18}$ in series with Zener diode 48. During acceleration with the relay $S_{22}$ in the position shown, a voltage with a break point in its slope will be generated at the output from the amplifier. Below the break point the output vs. the input has the relationship of $$\frac{R16 \;\&\; R17}{R10}$$

and above the break point the output voltage corresponds to the relationship $$\frac{R16 \times R17}{R10 \times R18}$$

$R18 \ll R17$ and $R16$. The break point is determined by the breakdown voltage of the Zener diode 48. The above described amplifier gain characteristic is required to form the acceleration schedule and avoid operation of the engine in the surge region.

The output of 46 of the amplifier is applied to one input of another "most gate" formed by diodes 50 and 52. These diodes select the most positive voltage which in turn corresponds to that signal calling for the highest fuel flow. The other input to this gate, applied to diode 52, is a voltage representing the flame out fuel flow and is applied when the engine reaches 100 percent speed to prevent the fuel flow from cutting back to a value which would cause flame out during deceleration. The flame out signal is generated by applying the DC B plus supply through resistor $R_{13}$ and the contact $S_{21}$ of relay $S_2$ to the anode of diode 52. The output of this most gate is applied to the base of a transistor $Q_1$ through resistor $R_{15}$. The diode 54 prevents damaging of the transistor with large reverse voltages. Control of the clutch coil 14 by transistor $Q_1$ is obtained by connecting one end of the coil to the collector of transistor $Q_1$ and the other end of the coil to the B plus supply. The emitter of the transistor $Q_1$ is connected to ground through a resistor $R_{21}$.

Diode 56 protects the transistor $Q_1$ from inductive surges through the coil 14.

During acceleration the input 37 of the operational amplifier 36 is coupled via contact $S_{12}$ to a bias network 38 comprising resistors $R_7$ and $R_8$ connected from the B plus supply to ground. An ambient temperature bias is obtained with a thermistor 58 which is in parallel with $R_8$. A fuel type bias is obtained by manually controlling the switch $S_4$ which parallels the resistor $R_8$ with resistor $R_9$ and will be described further. The bias network determines a quiescent current through coil 14 which determines the value of light-off fuel flow.

The recognition of the transition from the acceleration mode to the normal speed operation mode will now be described. A network is provided which recognizes when the relays $S_1$ and $S_2$ must be energized or de-energized for proper sequencing of the engine from acceleration to speed control and vice versa. Such mode sensing means is obtained by connecting the output junction 3 of the most gate 27 to a switch means 60. The junction 3 is connected to the comparator 61 via resistor $R_{30}$. The other input to comparator 61 is applied through resistor $R_{31}$ from a bias network made up of the series resistor combination of $R_{22}$ and $R_{23}$ connected from the B plus supply to ground. This bias voltage corresponds to the desired 100 percent normal operating speed of the engine. The output of the comparator is applied to the base of transistor $Q_4$ which has its emitter connected to ground and its collector coupled through the relays $S_1$ and $S_2$ to the B plus supply. The output junction 3 is also coupled to comparator 62 via resistor $R_{28}$. The other input to the comparator 62 is connected through $R_{29}$ to a bias network formed by resistors $R_{25}$ and $R_{26}$ coupled from the B plus supply to ground. The output of comparator 62 is coupled to the base of transistor $Q_6$ which has its emitter connected to ground and its collector coupled to the emitter of another transistor $Q_5$. The junction 3 also coupled through the Zener diode 64 and through resistor $R_{32}$ to the base of transistor $Q_5$ which has its base also coupled to ground through the resistor $R_{33}$. The collector of the transistor $Q_5$ is coupled to the B plus supply through resistor $R_{34}$ and to the base of transistor $Q_7$ through resistor $R_{35}$. The transistor $Q_7$ has its emitter connected to the B plus supply and its collector connected to ground through the series combination of resistors $R_{36}$ and $R_{37}$ the midpoint of which is in turn coupled to the bases of two driving transistors $Q_8$ and $Q_9$. Each of the latter two transistors in turn have their emitters coupled to ground and their collectors are respectively connected to the relays of the shutoff valve 66 and the igniter mechanisms 68.

In the operation of the fuel control during acceleration, the position of the relays $S_1$ and $S_2$ is as shown and the transistor $Q_4$ is held below cut off, holding the relays $S_1$ and $S_2$ de-energized. Comparator 62, on the other hand, is so biased that its output is highly positive at low speeds thereby keeping transistor $Q_6$ biased on and transistor $Q_3$ biased off. Furthermore, at low speeds the Zener diode 64 is not conducting thereby maintaining transistor $Q_5$ biased off.

With transistor $Q_5$ off, the base of transistor $Q_7$ is held positive, keeping it biased off and in turn holding transistors $Q_8$ and $Q_9$ in the non-conducting state to maintaining the shut-off valve relay 66 and the igniter relay 68 de-energized.

With an initial increasing engine speed, as for instance by hand cranking, the speed signal at junction 3 eventually overcomes the Zener break down voltage of Zener diode 64. The break down voltage of this Zener diode is selected to correspond to the desired value of the light-off speed. Thus when Zener diode 64 conducts the transistor $Q_5$ is turned on. Since transistor $Q_6$ is held in the biased on condition at very low speed by comparator 62, the break down of Zener diode 64 at the light-off speed results in the conduction of transistors $Q_7$, $Q_8$, and $Q_9$ thereby in turn energizing the shutoff valve relay and the igniter relay to commence fuel flow and ignition.

As the engine continues to increase in speed and approaches 100 percent of the selected normal speed operating range, the comparator 61 is switched, causing its output to go large positive. This in turn biases transistor $Q_4$ and $Q_2$ in the on condition. Transistor $Q_4$ thereupon energizes relays $S_1$ and $S_2$ which in turn transfer the acceleration operating mode to the speed operating mode. The turning on of transistor $Q_2$ places the resistor $R_{24}$ in parallel with resistor $R_{23}$ thereby effectively reducing the switch reference of comparator 61 to a lower value corresponding to a lower speed value. This is needed to insure that the output of comparator 61 remains positive until a shutdown is commanded at which point the comparator 61 is automatically reset for another start operation. In this manner the comparator effectively only operates while accelerating the engine to its normal operating speed and is effectively removed from the control loop after normal speed has been reached.

In the event the engine speed exceeds a predetermined value (the overspeed setting) a shutdown protective circuit must be employed. This is provided by the comparator 62 with its associated circuitry. The voltage set at the center point of the series combination of resistors $R_{25}$ and $R_{26}$ is applied to the other input of the comparator 62 through resistor $R_{29}$ and corresponds to the selected overspeed condition of the engine. When this overspeed occurs, the comparator 62 will switch its output to a large negative value which in turn causes transistor $Q_6$ to become biased off and transistor $Q_3$ to be biased on. The shutting off of transistor $Q_6$ turns transistor $Q_5$ off and effectively de-energizes the relays to the shutoff valve 66 and the ignition circuitry 68. As soon as the overspeed condition has been sensed by the comparator 62, the transistor $Q_3$ effectively lowers the switching point by bringing resistor $R_{27}$ in parallel with resistor $R_{26}$ so that at first the overspeed condition will be maintained sufficient for actuation of all the protective circuitry and secondly for automatic drop out when the reduced overspeed condition has been attained.

When the normal operating speed has been reached and the relay $S_1$ is energized by transistor $Q_4$, the contacts $S_{11}$ and $S_{12}$ are connected across the bridge circuitry at the output of the alternator 30. The bridge comprises the resistors $R_1$, $R_2$, $R_3$, and capacitor $C_2$. One leg of the bridge is obtained at the junction 1 formed by resistors $R_1$ and $R_2$ and represents a DC voltage since it is rectified by diode 32. The other leg is taken at junction 2 and represents the DC equivalent of the voltage at the junction between capacitor $C_2$ and resistor $R_3$. This DC voltage at junction 2 is obtained through the rectifying diode 34. Since the second leg of the bridge is sensitive to both the amplitude and the frequency of the alternator signal, it produces, through the rectification by diode 34, a DC voltage representative of both the frequency and the amplitude. On the other hand, the voltage at the junction 1 is essentially only sensitive to the amplitude of the alternator voltage so that the difference between the junctions 1 and 2 provide a signal suitable for steady state speed governing during normal running conditions of the engine. It should be understood here that, at the normal operating speeds of the engine, the alternator 30 produces an AC voltage which is relatively constant in amplitude but varies in frequency. The frequency in turn is dependent upon the engine speed, so that one may look upon the voltage at junction 1 as the reference voltage and the voltage at junction 2 as the variable signal indicative of the speed of the engine. The difference between these two signals may then be used to schedule the fuel to the engine by controlling the current through the clutch coil 14. By taking the speed signal across this bridge rather than off one side with respect to the ground, the bridge becomes a nulling circuit with a zero output at the appropriate speed set point, as determined by the resistors $R_1$ and $R_2$. A plus or minus voltage will be generated as the actual engine speed swings from one side to the other of the null point. In this manner, a positive or negative error voltage is produced to command increasing or decreasing currents through the clutch coil 14.

In the selection of the pump and the design of the fuel control, the type of fuel being used must be taken into consideration because the pump fuel weight flow will vary for different viscosity fuels; and the gain of the amplifier must be changed accordingly. For instance, typical viscosity and density contributions to gain changes for high, intermediate, and low fuel viscosities, from standard day to minus 65° F., for 25 centistokes viscosity are as follows:

|  | Viscosity | Density |
| --- | --- | --- |
| JP-5 diesel | 10:1 | 1.08:1 |
| JP-4 | 5:1 | 1.08:1 |
| Aviation gasoline | 2.7:1 | 1.10:1 |

The pump leakage effects due to these viscosity variations will contribute to the gain variation of the fuel control. Reduced leakage will tend to raise the gain from pump volumetric flow to actual delivered engine flow. The exact magnitude of this effect is dependent upon the pump design. It is expected that these factors produce a 1.25 to 1 change in the gain and, therefore, the acceleration schedule must be controlled as a function of the ambient temperature. In addition, a manual adjustment of the fuel control gain is included to accommodate the gain change resulting from a change in the type of fuel employed. This feature is provided by the switch $S_3$ in the feedback loop across the amplifier 36. In this instance, a single resistance $R_{44}$ is provided which alters the gain for one type of fuel by opening the switch $S_3$. The closing of the switch produces the desired gain for another type of fuel. Similarly, the acceleration bias obtained from network 38 is shifted for different types of fuels by switch $S_4$ so that resistor $R_9$ may be selectively added to the circuit depending upon the type of fuel. Switches $S_3$ and $S_4$ are ganged together.

The power for this electronic circuitry may be obtained from conventional sources such as batteries or rectified power generators such as the alternator 30 and the permanent magnet generator 16.

From the above description, it can be seen that a significant and simple electronic fuel control has been provided for a small gas turbine engine utilizing a minimum amount of rotational mechanical components and resulting in a highly reliable device. Such a fuel control may be utilized in conjunction with an engine that is used to drive a low power alternator.

We claim:
1. A fuel control for a small gas turbine engine wherein a first speed signal is obtained from a permanent magnet generator driven by the engine for use at low speeds of the engine and a second speed signal is obtained from an alternator also driven by the engine for use at high speeds of the engine comprising:
    means including a most gate having its inputs coupled to the first and second speed signals for producing a speed voltage indicative of the larger engine speed represented by the first and second speed signals;
    means producing a speed reference voltage indicative of the desired operating speed of the engine;
    means including a variable gain amplifier coupled to the speed voltage and the speed reference voltage for producing a fuel control voltage comprising an acceleration control voltage when substantially controlled by the first speed signal and comprising a speed control voltage when substantially controlled by the second speed signal for speed control of the engine, said amplifier having a first gain characteristic for producing the acceleration control voltage and a second gain characteristic for producing the speed control voltage;

switch means actuated by the speed voltage for operatively controlling the production of the acceleration and speed control voltages, said switch means including:
    a switch reference voltage indicative of the desired engine speed at which the switch means is actuated, and
    a comparator responsive to the speed voltage and the switch reference voltage for producing an output voltage for the desired actuation of the switch means;

second switch means producing an ignition signal, said switch means including:
    a second switch reference voltage indicative of the desired engine speed at which said second switch means is actuated,
    a second comparator responsive to the speed voltage and the switch reference voltage for producing an output voltage for the desired actuation of the second switch means; and fuel control means responsive to said fuel control voltage.

References Cited
UNITED STATES PATENTS

| | | |
|---|---|---|
| 2,623,354 | 12/1952 | Best. |
| 2,827,910 | 3/1958 | Wells et al. |
| 2,842,108 | 7/1958 | Sanders. |
| 3,085,407 | 4/1963 | Tomlinson. |
| 3,240,013 | 3/1966 | Spath _____ 60—39.28 |

AL LAWRENCE SMITH, Primary Examiner

U.S. Cl. X.R.

230—15